United States Patent [19]

Hurlburt

[11] Patent Number: 4,949,535
[45] Date of Patent: Aug. 21, 1990

[54] CONDITIONING ROLL BIASING MECHANISM

[75] Inventor: Joseph C. Hurlburt, Lancaster, Pa.

[73] Assignee: Ford New Holland, Inc., New Holland, Pa.

[21] Appl. No.: 377,876

[22] Filed: Jul. 10, 1989

[51] Int. Cl.⁵ .................. A01D 43/10; A01D 82/00
[52] U.S. Cl. .......................... 56/16.4; 56/1;
    56/DIG. 1; 100/168; 100/171
[58] Field of Search .............. 56/1, 16.4, DIG. 1,
    56/14.1, 192; 100/168, 169, 171

[56] References Cited

U.S. PATENT DOCUMENTS

| | | | |
|---|---|---|---|
| 2,737,130 | 3/1956 | Rhodes | 100/171 |
| 3,405,512 | 10/1968 | Hubenaar | 56/DIG. 1 |
| 3,489,079 | 1/1970 | Aurich et al. | 100/168 |
| 4,127,981 | 12/1978 | Parrish et al. | 56/DIG. 1 |
| 4,137,696 | 2/1979 | Webb | 56/DIG. 1 |
| 4,172,353 | 10/1979 | Meek et al. | 56/DIG. 1 |
| 4,174,602 | 11/1979 | Webb et al. | 56/DIG. 1 |
| 4,174,603 | 11/1979 | Parrish | 56/DIG. 1 |
| 4,519,188 | 5/1985 | Webster et al. | 56/16.4 |

Primary Examiner—Bruce M. Kisliuk
Attorney, Agent, or Firm—Larry W. Miller; Frank A. Seemar; Darrell F. Marquette

[57] ABSTRACT

A biasing mechanism for a roll-type conditioning apparatus having a pair of generally vertically spaced, counterrotating conditioning rolls in which the upper roll is biased toward engagement with the lower roll is disclosed wherein a torsion bar interconnects the opposing ends of the upper roll such that any movement of either end of the upper roll away from the lower roll effects a twisting of the torsion bar to increase the biasing force exerted thereby on both ends of the upper conditioning roll. The torsion bar is connected to a mounting mechanism which includes a hub assembly pivotally connected to the frame of the conditioning apparatus on a pivot arm movably mounting one end of the upper conditioning roll. The pivotal connection of the hub assembly effects a rotational movement thereof whenever the pivot arm is moved to effect a corresponding twisting of the torsion bar connected thereto. The mounting mechanism includes an adjustment apparatus operable to vary the minimum biasing force exerted on the upper roll by the torsion bar. Any movement of either end of the upper conditioning roll with result in a twisting of the torsion bar to effect an increase in tensioning force exerted thereby on both ends of the upper conditioning roll, while a simultaneous movement of both ends of the upper roll will effect an opposing twisting of the respective ends of the torsion bar.

19 Claims, 6 Drawing Sheets

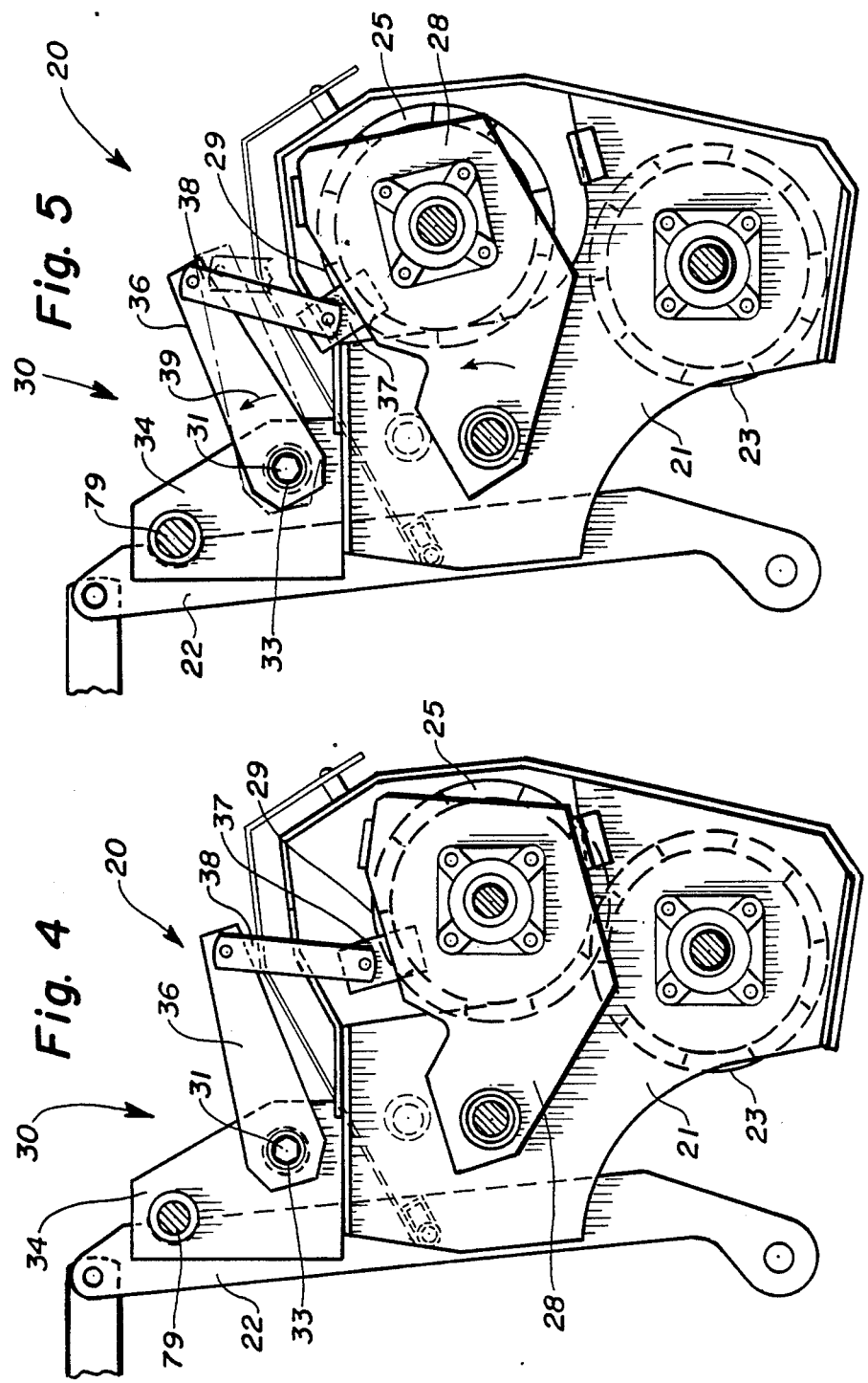

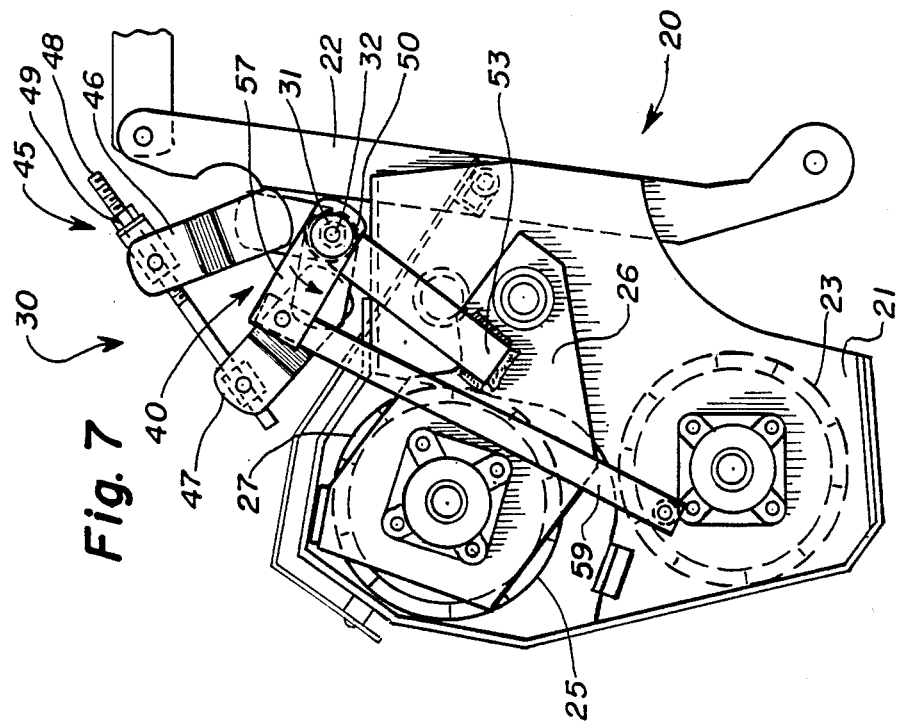
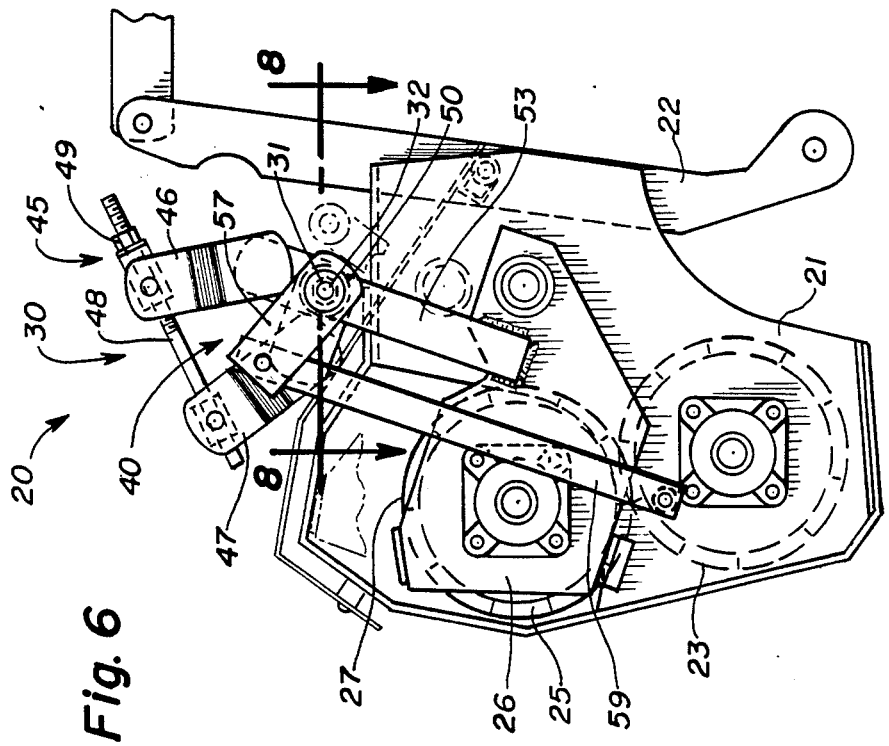

4,949,535

CONDITIONING ROLL BIASING MECHANISM

BACKGROUND OF THE INVENTION

The present invention relates generally to crop harvesting machines containing a conditioning apparatus to condition crop material fed thereto and, more particularly, to a biasing mechanism for urging the upper conditioning roll toward engagement with the fixed lower roll.

Mower conditioners typically include a crop gathering header which is normally provided with a cutterbar operable to sever standing crop material from the field, a conveying device, such as a rotating reel and/or an auger, to convey the severed crop material rearwardly over the cutterbar, and a conditioning mechanism mounted rearwardly of the cutterbar to receive severed crop material from the reel or auger and effect a conditioning of the severed crop to hasten the drying thereof. Although flail-type conditioners have enjoyed some success, conditioning mechanisms in North America generally include a pair of vertically spaced, counterrotating conditioning rolls operable to receive severed crop material therebetween to effect a conditioning thereof.

Because of varying thicknesses of materials passing between the counterrotating conditioning rolls, the upper conditioning roll has traditionally been mounted on pivot arms to permit a generally vertical movement toward and away from the fixed lower conditioning roll. To assure maximum engagement with the crop material to be conditioned, the upper conditioning roll is usually engaged with a biasing mechanism to urge the upper conditioning roll toward engagement with the lower conditioning roll. As the upper roll moves away from the lower roll, the biasing force is normally increased.

More recent biasing mechanisms for mower conditioners have utilized torsion bars to exert the biasing force on the upper conditioning roll. Typically, torsion bars extend from a central mounting mechanism outwardly to corresponding linkages interconnecting the torsion bar to the pivot arms for the end of the upper conditioning roll. An adjustment mechanism bridges between the mounting mechanism and the conditioner frame to permit a varying of the minimum biasing force exerted on the upper conditioning roll when the upper roll is as close to the lower conditioning roll as will be permitted by the structure limiting movement of the upper conditioning roll. Such biasing systems are complex and expensive to manufacture. Accordingly, it would be desirable to provide an improved torsion bar biasing mechanism that would be simpler and less expensive to manufacture and maintain.

SUMMARY OF THE INVENTION

It is an object of this invention to overcome the aforementioned disadvantages of the prior art by providing a torsion bar biasing mechanism for urging the upper conditioning roll toward engagement with the lower conditioning roll in a roll-type conditioning mechanism.

It is another object of this invention to provide a conditioning roll biasing mechanism utilizing a torsion bar wherein the movement of either end of the upper conditioning roll results in a twisting of the torsion bar to effect a loading of both ends of the upper conditioning roll simultaneously.

It is a feature of this invention that the adjusting mechanism to vary the minimum biasing force exerted upon the upper conditioning roll by the torsion bar is located at one end of the biasing mechanism.

It is an advantage of this invention that the twisting of one end of the torsion bar responding to the movement of one end of the upper conditioning roll results in an increase of the biasing force exerted on both ends of the upper conditioning roll.

It is another feature of this invention that the torsion bar is connected to a mounting mechanism including a hub assembly that is journaled on the corresponding pivot arm rotatably mounting one end of the upper conditioning roll and is pivotally connected to the frame to provide a fixed anchor effecting rotation of the hub assembly whenever the pivot arm is moved to effect a corresponding movement of the upper conditioning roll.

It is another advantage of this invention that a rotation of the hub assembly mounting one end of the torsion bar whenever the pivot arm is raised to move the corresponding end of the upper conditioning roll away from the lower conditioning roll effects a rotation of the torsion bar to increase the biasing force exerted on both ends of the upper conditioning roll.

It is still another object of this invention to provide an adjustment apparatus at the side of the conditioning mechanism to be cooperable with the torsion bar to permit a varying of the minimum biasing force exerted thereby.

It is still another feature of this invention that the adjustment apparatus works against the anchoring of the hub assembly of the frame to provide an adjustment of the biasing force exerted by the torsion bar.

It is yet another advantage of this invention that a conditioning roll biasing mechanism can be manufactured and maintained less expensively.

It is yet another feature of this invention that the hub assembly can be manufactured from two interconnected hub members that are pinned together to facilitate manufacturing and assembly.

It is yet another feature of this invention that the rotation of the hub member upon vertical movement of the corresponding pivot arm is transferred to the corresponding end of the torsion bar through the adjustment mechanism.

It is yet another object of this invention to provide a conditioning roll biasing mechanism for utilization on a mower conditioner which is durable in construction, inexpensive of manufacture, carefree of maintenance, facile in assemblage, and simple and effective in use.

These and other objects, features, and advantages are accomplished according to the instant invention by providing a biasing mechanism for a roll-type conditioning apparatus having a pair of generally vertically spaced, counterrotating conditioning rolls in which the upper roll is biased toward engagement with the lower roll wherein a torsion bar interconnects the opposing ends of the upper roll such that any movement of either end of the upper roll away from the lower roll effects a twisting of the torsion bar to increase the biasing force exerted thereby on both ends of the upper conditioning roll. The torsion bar is connected to a mounting mechanism which includes a hub assembly pivotally connected to the frame of the conditioning apparatus on a pivot arm movably mounting one end of the upper conditioning roll. The pivotal connection of the hub assembly effects a rotational movement thereof whenever the pivot arm is moved to effect a corresponding twisting of the torsion bar connected thereto. The mounting mechanism includes an adjustment apparatus operable to vary the minimum biasing force exerted on the upper roll by the torsion bar. Any movement of either end of the upper conditioning roll will result in a twisting of the torsion bar to effect an increase in tensioning force exerted thereby on both ends of the upper conditioning roll, while a simultaneous movement of both ends of the upper roll will effect an opposing twisting of the respective ends of the torsion bar.

BRIEF DESCRIPTION OF THE DRAWINGS

The advantages of this invention will become apparent upon consideration of the following detailed disclosure of the invention, especially when taken in conjunction with the accompanying drawings wherein:

FIG. 4 is a cross-sectional view taken along lines 4—4 of FIG. 3 to provide a side elevational view of the right side of the conditioning mechanism, extraneous components being removed for purposes of clarity;

FIG. 5 is a side elevational view corresponding to that shown in FIG. 4 with the upper conditioning roll being vertically moved away from the lower conditioning roll, the movement of the torsion bar connecting linkage being shown in phantom;

FIG. 6 is a side elevational view of the left side of the conditioning mechanism taken along lines 6—6 of FIG. 3 with extraneous components being removed for purposes of clarity, the extent of upward movement of the upper conditioning roll and associated linkage being shown in phantom;

FIG. 7 is a left side elevational view similar to that of FIG. 6 showing the components with the upper conditioning roll being vertically moved away from the lower conditioning roll to effect a twisting of the torsion bar.

DETAILED DESCRIPTION OF THE PREFERRED EMBODIMENT

Figure 1:
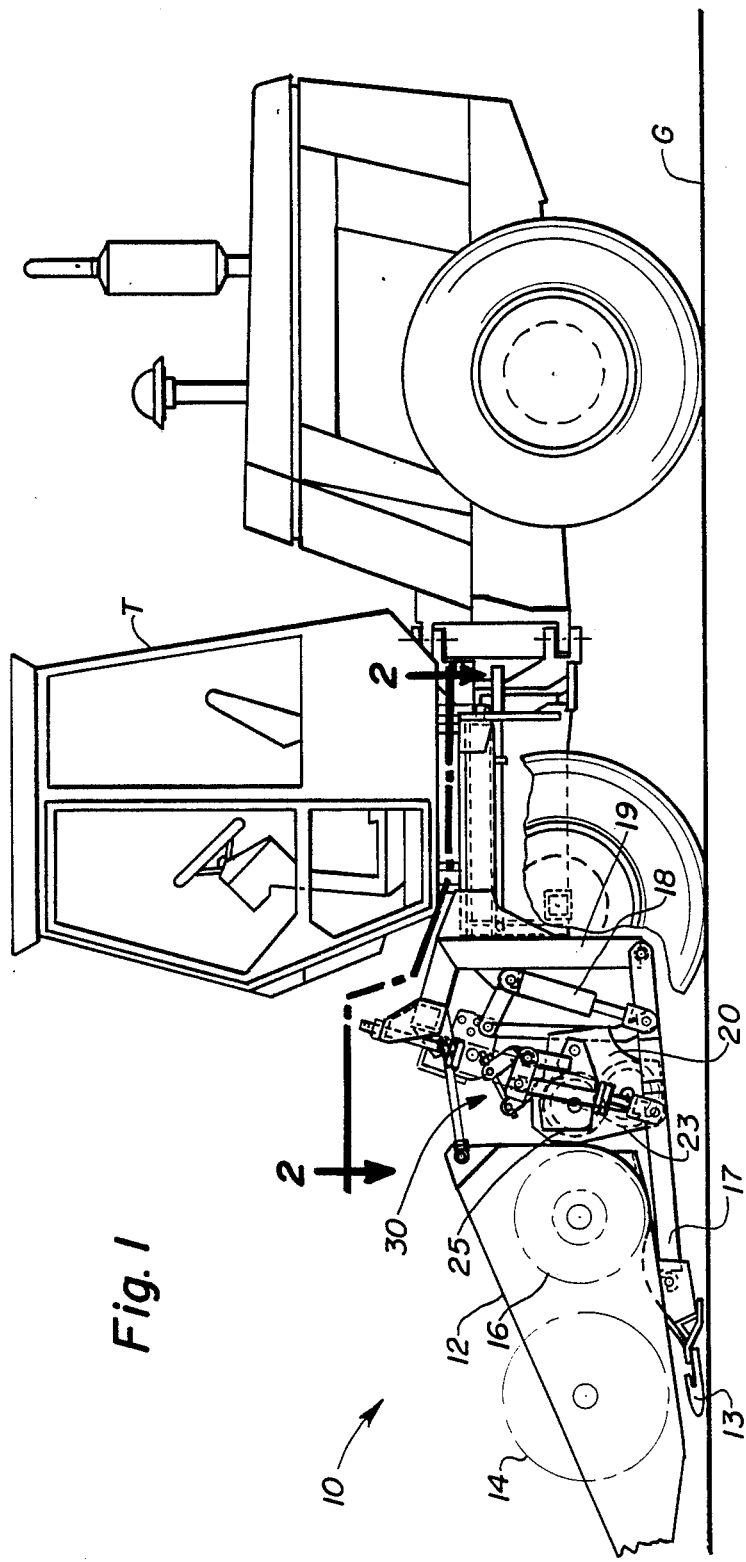
FIG. 1 is a side elevational view a crop harvesting machine mounted on a tractor, the crop harvesting machine including a crop gathering header and a rearwardly positioned conditioning mechanism incorporating the principles of the instant invention, portions of the tractor and crop gathering header being broken away for purposes of clarity.
Figure 2:
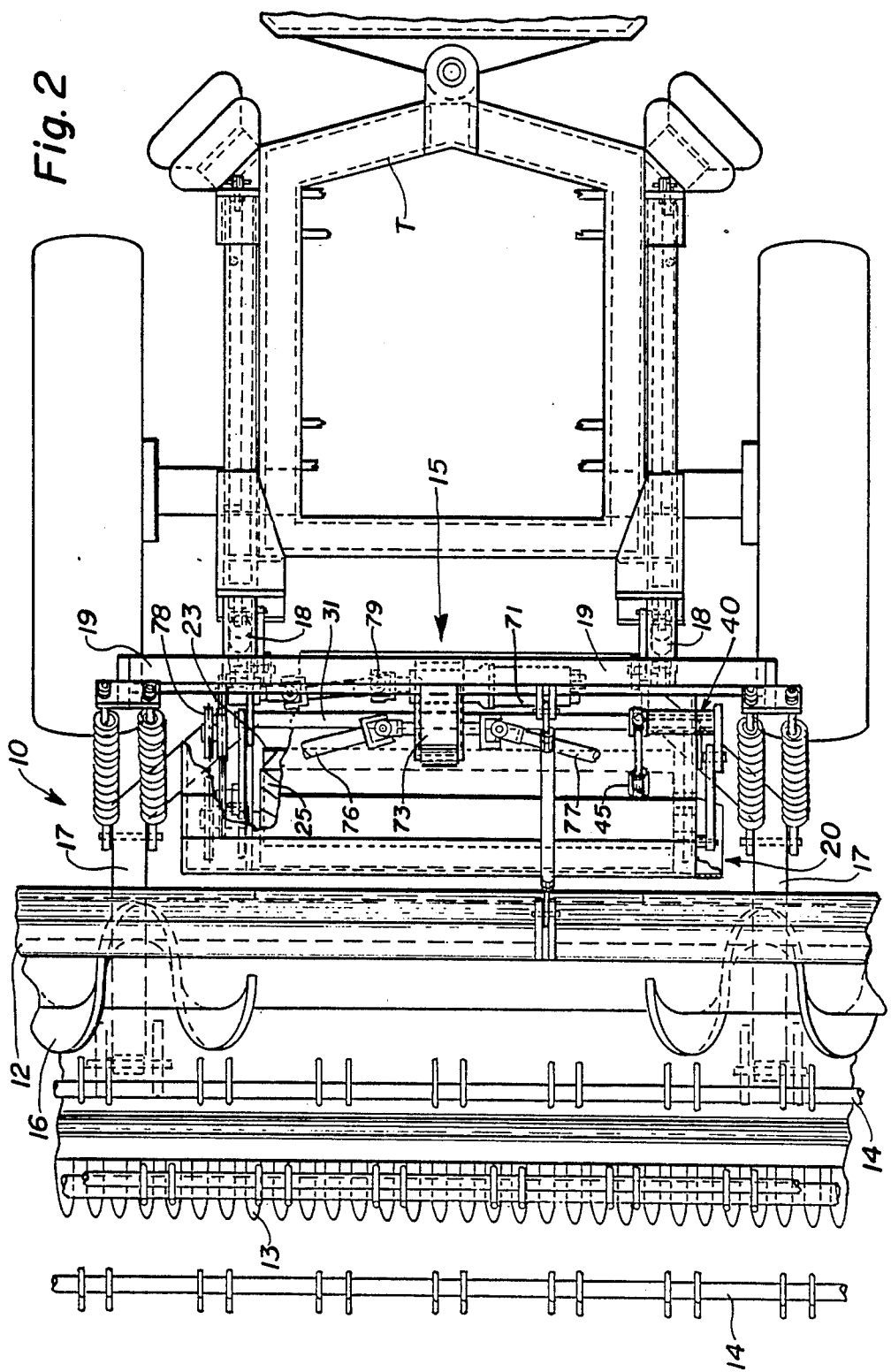
FIG. 2 is a cross-sectional view of the crop harvesting machine taken along lines 2—2 of FIG. 1 to shown a top plan view of the crop gathering header and conditioner, a major portion of the tractor and crop gathering header being broken away to facilitate a viewing of the conditioning mechanism incorporating the principles of the instant invention.
Figure 3:
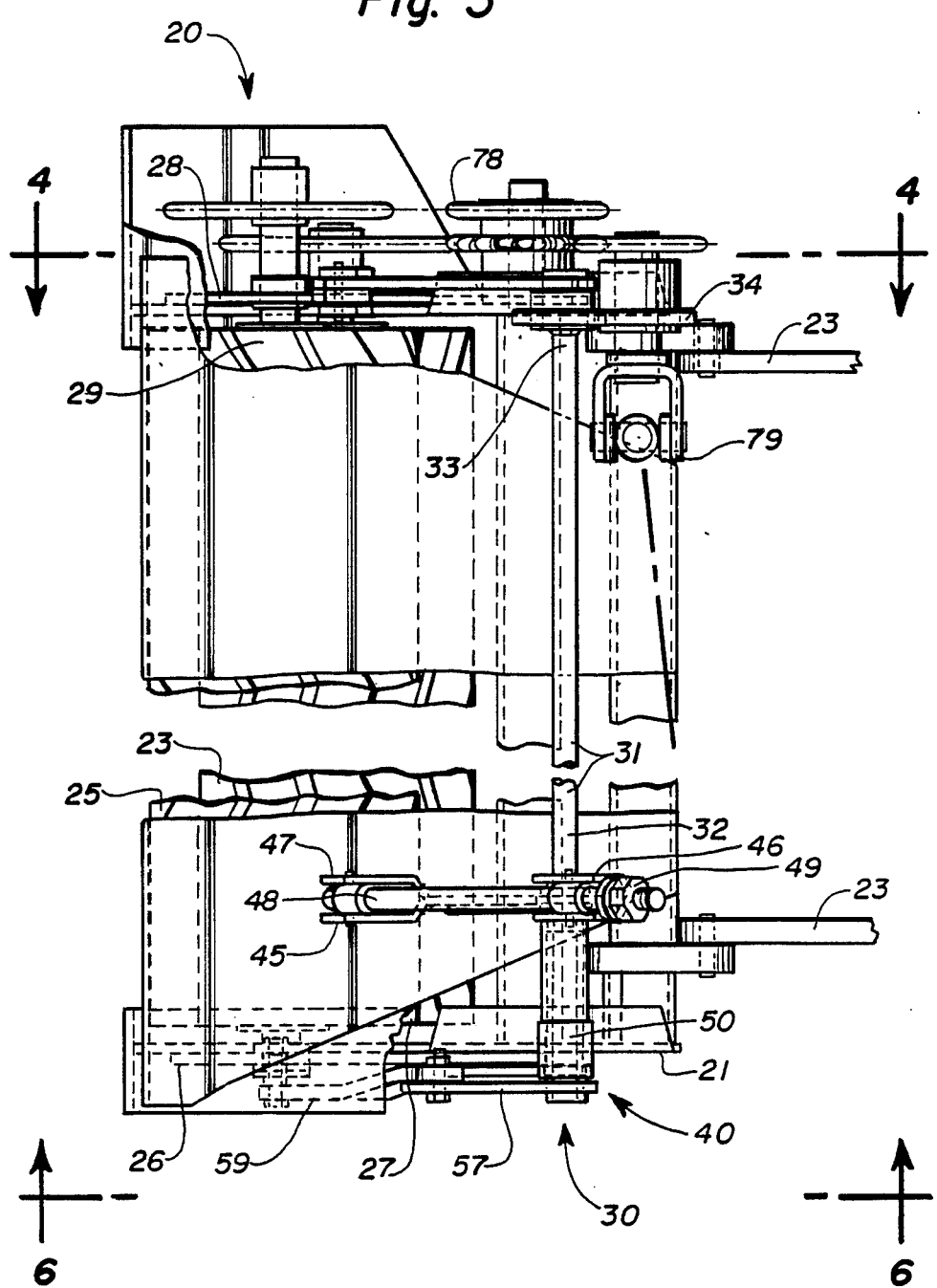
FIG. 3 is an enlarged top plan view of the conditioning mechanism shown in FIG. 2 with the central portion thereof being broken away to better show the invention.

Referring now to the drawings and, particularly, to FIGS. 1–3, side elevational and top plan views of a crop harvesting machine, attached to a prime mover, such as a tractor, incorporating the principles of the instant invention, can best be seen. Any left and right references are used as a matter of convenience and are determined by standing at the rear of the tractor, facing the forward end, the direction of travel. Although the drawings depict the deployment of this invention on a tractor mounted crop harvesting machine, commonly referred to as a mower conditioner or a windrower, one skilled in the art will readily realize that the principles of the instant invention will be equally applicable to any pull-type or self-propelled crop harvesting machine utilizing a biasing force to urge a movable member toward engagement with a fixed member.

The crop harvesting machine 10 is of the type to be mounted on the forward end of a conventional tractor T to be pushed into the crop material to be harvested. The crop harvesting machine 10 includes a crop gathering header 12 which includes a conventional reciprocating cutterbar 13 to sever standing crop material from the ground G, a rotating reel 14 to convey the severed crop material over the cutterbar 13 and rearwardly therefrom in a conventional manner, and an auger 16 transversely extending along the rear of the crop gathering header 12 to receive severed crop material from the reel 14, converge the crop material and discharge it toward the rearwardly positioned conditioning mechanism 20. The crop gathering header 12 is mounted on forwardly extending lift arms 17 that are pivotally connected to the frame 19 of the crop harvesting machine 10 and pivotally movable by hydraulic lift cylinders 18 to effect a raising and lowering of the crop gathering header 12 relative to the ground G.

The crop harvesting machine 10 has a drive mechanism 15 best seen in FIG. 2 to power the operation of both the crop gathering header 12 and the conditioning mechanism 20. The drive mechanism 15 includes a hydraulically powered motor 71 that provides rotational power to a gear box 73 which in turn delivers rotational power to opposing ends of the crop gathering header 12 through drive shaft 76, 77 and to a chain drive mechanism 78 for the conditioning mechanism 20 through the drive shaft 79.

The conditioning mechanism 20 is positioned immediately rearwardly of the crop gathering header 12 and is supported from the frame 19 of the crop harvesting machine 10 by a subframe 21 including support links 22 interconnecting the frame 19 and the lift arms 17. The conditioning mechanism 20 is provided with a lower conditioning roll 23 rotatably mounted in a fixed orientation in the subframe 21. The conditioning mechanism 20 also includes an upper conditioning roll 25 rotatably journaled in transversely spaced left and right pivot arms 26, 28, respectively, pivotally connected to the subframe 21 in mounting the left and right ends, 27, 29, respectively, of the upper conditioning roll 25 for generally vertical movement toward and away from the lower conditioning roll 23.

The conditioning mechanism 20 is also provided with a biasing mechanism 30 which is operably associated with the upper conditioning roll 25 to exert a biasing force thereon to urge the upper conditioning roll 25 toward engagement with the lower conditioning roll 23 to exert a proper conditioning on the severed crop material passing between the upper and lower conditioning rolls 25, 23. The biasing mechanism 30 includes a transversely oriented torsioning bar 31 having left and right ends 32, 33 generally adjacent to and spaced above the left and right ends 27, 29 of the upper conditioning roll 25. Rotational power is delivered to both the upper and lower conditioning rolls 25, 23 by means of the chain drive apparatus 78 rotatably driven by the conditioning drive shaft 79.

Referring now to FIGS. 3–5, the connection of the right end 33 of the torsion bar 31 to the right end 29 of the upper conditioning roll 25 can best be seen. The torsion bar 31 is rotatably supported by a bracket 34 attached to the subframe 21 of the conditioning mechanism 20, the bracket 34 also rotatably supporting the conditioner drive shaft 79. A torsion arm 36 is engaged with the right end 33 of the torsion bar 31 to be rotatable therewith. The torsion arm 36 is connected to a tab 37 affixed to the right pivot arm 28 by a connecting link 38 extending therebetween. The geometry of the connecting link 38 and the pivotal movement of the right pivot arm 28 is such that the upward movement of the pivot arm 28 to move the right end 29 of the upper conditioning roll 25 away from the lower roll 23 will effect an upward rotational movement of the torsion arm 36 as indicated in phantom and by the arrow 39 in FIG. 5. One skilled in the art will readily see that the movement of the right pivot arm 28 away from the lower conditioning roll 23 will result in a counterclockwise rotation of the torsion bar 31, when viewed from the right side of the conditioning mechanism 20, the twisting of the torsion bar 31 resulting in an increased biasing force exerted on the right pivot arm 28 to urge the upper roll 25 toward the lower roll 23.

The connection of the left end 32 of the torsion bar 31 to the left end 27 of the upper roll 25 can best be seen in FIGS. 3 and 6–8. Looking first at the cross-sectional detailed view of FIG. 8, it can be seen that the left end 32 of the torsion bar 31 is engaged with a mounting mechanism 40 to control the twisting movement of the torsion bar 31 in response to the pivotal movement of the left pivot arm 26 rotatably supporting the left end 27 of the upper conditioning roll 25.

Figure 8:
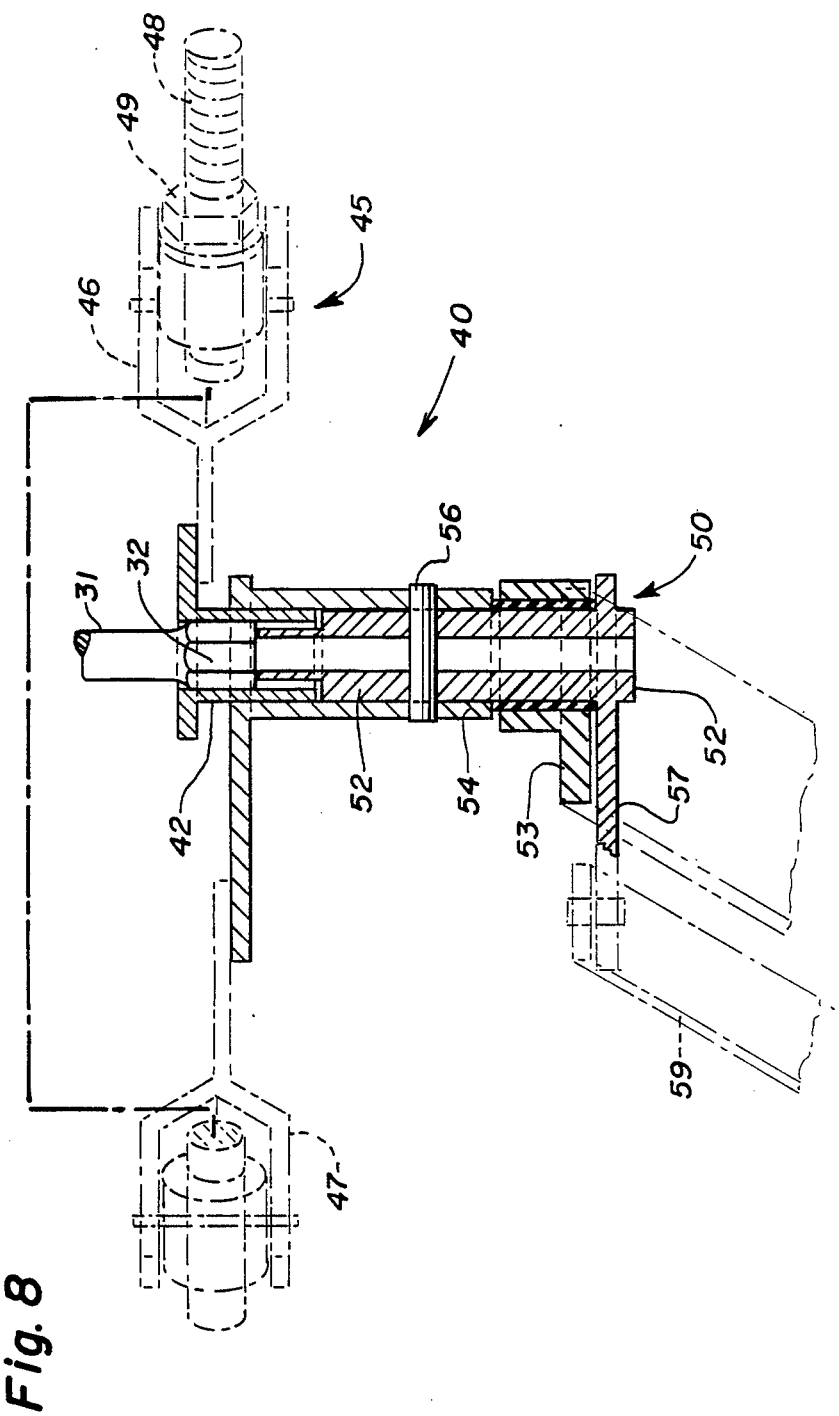
FIG. 8 is a cross-sectional detail view corresponding to lines 8—8 of FIG. 6 to show the details of the mounting mechanism connected to the left end of the torsion bar.

Referring to FIGS. 6–8, the mounting mechanism 40 includes a mounting collar 42 engaged directly with the left end 32 of the torsion bar 31 and rotatably supported by a hub assembly 50 such that the mounting collar 42 is rotatable with respect to the hub assembly 50 but movable directly with the torsion bar 31. The hub assembly 50 includes a first hub member 52 journaled on a support member 53 directly connected to the left pivot arm 26 to be movable therewith. The hub assembly 50 also includes a second hub member 54 connected to the first hub member 55 by a bolt or pin 56 and rotatably supporting the mounting collar 42. The first and second hub members 52, 54 are constructed in this two piece configuration to facilitate assembly.

As best seen in FIGS. 3 and 6–8, the mounting mechanism 40 includes an adjustment apparatus 45 operable to vary the minimum biasing force exerted on the upper conditioning roll 25 by the torsion bar 31, the minimum biasing force being defined as the biasing force exerted by the torsion bar 31 when the upper conditioning roll 25 is positioned as closely as permitted to the lower conditioning roll 23. For those conditioning mechanisms 20 incorporating intermeshing rubber conditioning rolls or the equivalent, the minimum biasing force is exerted on the upper conditioning roll 25 when the upper roll 25 is in intermeshing engagement with the lower conditioning roll 23.

The adjustment apparatus 45 includes a first adjustment member 46 affixed to the mounting collar 42 to be movable therewith and a second adjustment member 47 affixed to the second hub member 54 of the hub assembly 50 to be movable therewith. Adjustment apparatus 45 also includes a draw bolt 48 engaged with both the first and second adjustment members 46, 47 such that a nut 49 threaded on the draw bolt 48 is operable to draw the two adjustment members 46, 47 toward each other and, thereby, effect a twisting of the left end 32 of the torsion bar 31 relative to the hub assembly 50. Other draw bolt configurations are equally applicable, such as a headed draw bolt 48 threadably engaged with the adjustment member opposite to the head so long as a selective rotation opposite to the draw bolt or associated fastener will effect a relative movement between the two adjustment members 46, 47.

As best seen in FIGS. 6–8, the first hub member 52 includes as anchoring arm 57 extending perpendicularly from the first hub member 52 for pivotal connection with a connecting link 59 which in turn is pivotally connected at the opposing end thereof to the conditioning mechanism subframe 21 to provide an anchoring mechanism for the hub assembly 50. As will be described in greater detail below, the anchoring of the hub assembly 50 by the connecting link 59 permits the hub assembly 50 to be stationarily held while the adjustment apparatus 45 effects a twisting of the torsion bar 31 to vary the minimum biasing force exerted on the upper roll 25.

As described above with respect to the right end of the conditioning mechanism 20 shown in FIGS. 4 and 5, the movement of the right pivot arm 28 effects a counterclockwise twisting of the torsion bar 31 when viewed from the right side of the conditioning mechanism 20. This same twisting of the torsion bar 31 when viewed from the left side of the conditioning mechanism 20 as shown in FIGS. 6 and 7 would be seen as a clockwise twisting or rotation of the torsion bar 31. Such torsion bar rotation, would urge a rotation of the hub assembly 50, the rotational forces exerted by the torsion bar 31 being transmitted through the adjustment apparatus 45 to the hub assembly 50. Due to the connection of the anchoring arm 57 to the connecting link 59, which in turn is pivoted to the conditioning mechanism subframe 21, the hub assembly 50 will attempt to rotate about the pivotal connection between the anchoring arm 57 and the connecting link 59. As a result, the hub assembly will press downwardly on the support member 53 welded to the left pivot arm 26 and urge the upper conditioning roll 25 toward engagement with the lower conditioning roll 23. Accordingly, the upward movement of the right pivot arm 28 will result in a twisting of the torsion bar 31 to effect an additional loading of biasing forces on both ends of the upper conditioning roll 25.

A corresponding upward movement of the left pivot arm 26 will effect a lifting of the hub assembly 50 due to its direct connection with the support member 53; however, since the first hub member 52 is anchored to the conditioning mechanism subframe 21 by the connecting link 59, the upward movement of the left pivot arm 26 will result in a counterclockwise rotation of the first hub member 52 as it is being lifted with the left pivot arm 56. As best seen in FIG. 8, the counterclockwise rotation of the first hub member 52, as viewed from the left side of the conditioning mechanism 20, causes a similar rotation of the second hub member 54 because of the bolted connection 56 and a similar counterclockwise rotation of the mounting collar 42 because of the interconnection between the mounting collar 42 and the second hub member 54 by the adjustment apparatus 45. The counterclockwise rotation of the mounting collar 42 effects a corresponding counterclockwise twisting of the left end 32 of the torsion bar 31.

Referring back to FIGS. 4 and 5, the counterclockwise rotation of the torsion bar 31 as viewed from the left side of the conditioning mechanism 20 will be seen as a clockwise rotation of the torsion bar 31 when viewed from the right side of the conditioning mechanism 20. The clockwise rotation of the torsion bar 31 along the right side of the conditioning mechanism 20 effects a downward movement of the torsion arm 36 and a consequential urging of the right pivot arm 28 and attached right end 29 of the upper conditioning roll 25 toward engagement with the lower conditioning roll 23. Accordingly, a lifting of the left pivot arm 26 will result in an additional loading of biasing force to both ends 27, 29 of the upper conditioning roll 25.

It will be seen then, reference being had to FIGS. 3–8, that a simultaneous lifting of both ends 27, 29 of the upper conditioning roll 25 will result in additional loading of biasing force on both ends 27, 29 of the upper conditioning roll 25 to urge the upper roll 25 toward engagement with the lower roll 23. Movement of the right arm 28 will effect a counterclockwise twisting of the torsion bar 31 when viewed from the right side of the conditioning mechanism 20 as described in detail above, while the upward movement of the left pivot arm 56 will result in a counterclockwise rotation of the torsion bar 31 when viewed from the left side of the conditioning mechanism 20. This counterrotating of the torsion bar 31 from both ends 27, 29 of the upper conditioning roll 25 results in a wringing of the torsion bar 31 to effect an additional loading of biasing force on the upper conditioning roll 25 to urge it toward the lower conditioning roll 23.

Referring to FIGS. 4–7, one skilled in the art will readily realize that the geometry of the linkages interconnecting the torsion bar 31 and the respective ends 27, 29 of the upper conditioning roll 25 provides for a reduction of the length of the moment arm for the exertion of the biasing force from the torsion bar 31 about the pivotal mounting of the corresponding pivot arm 26, 28 as the pivot arms 26, 28 rotate to raise the upper roll 25 relative to the lower roll 23. Accordingly, even though the biasing force exerted by the torsion bar 31 increases as the upper roll 25 raises, the application of that force on the upper roll 25 decreases because of the shortening of the moment arm through which that biasing force is applied. As a result, the pressure exerted by the upper roll 25 on the crop material passing between the upper and lower conditioning rolls 25, 23 lessens as the upper roll 25 moves away from the lower roll 23 to facilitate the passage of slugs of crop material through the conditioning mechanism 20.

It will be understood by one skilled in the art that this particular biasing mechanism 30 construction, results in each end 32, 33 of the torsion bar 31 working against the opposing end 33, 32 to create an additional loading of biasing force to the upper conditioning roll 25 when it separates from the lower conditioning roll 23. A variation of the minimum biasing force exerted on the upper conditioning roll 25 can be selectively adjusted through the operation of the adjustment apparatus 45 working against a frame anchor 59 for the hub assembly 50. Without the need for anchoring the torsion bar at the center of the conditioning mechanism 20 and a complex apparatus for varying the minimum biasing force exerted on the conditioning roll 25, as is known from prior art mechanisms, the instant invention is capable of being manufactured at lower cost while providing a convenient means for accessing the adjustment of the biasing pressure.

It will be understood that changes in the details, materials, steps, and arrangement of parts which have been described and illustrated to explain the nature of the invention will occur to and may be made by those skilled in the art upon a reading of this disclosure within the principles and scope of the invention. The foregoing description illustrates the preferred embodiment of the invention; however, concepts as based upon the description may be employed in other embodiments without departing from the scope of the invention. Accordingly, the following claims are intended to protect the invention broadly as well as in the specific form shown.

Having thus described the invention, what is claimed is:

1. In a conditioniang mechanism for use on a crop harvesting machine having a frame; crop gathering crop means disposed forwardly of said condiitoning mechanism to gather crop material from a field and convey the crop material rearwardly to the conditioning mechanism, said conditioniung mechanism having a rotatable transverse lower roll, a rotatable transverse upper roll positioned above said lower roll and being mounted for movement toward and away from said lower roll, said uper roll having first and second transversely spaced ends, and a biasing mechanism operably connected to the ends of said upper roll to urge said upper roll toward said lower roll; and drive means operably connected to said upper and lower rolls to power the rotation of said upper and lower rolls to condition crop material passing therebetween, an improved biasing mechanism comprising:

a torsion bar having first and second transversely spaced ends corresponding to and operably interconnected with the opposing ends of said upper roll such that any movement of either said upper roll end away from said lower roll effects a twisting of both the corresponding torsion bar end and the opposing torsion bar end to increase the biasing force exerted thereby simultaneously on both said upper roll ends, the movement of one of said upper roll ends away from said lower roll urging a movement of the other said upper roll end in an opposing direction toward said lower roll, said torsion bar exerting a biasing force on said upper roll and having one of said torsion bar ends connected to a mounting mechanism connected to said frame to control the twisting movement of said one torsion bar end.

2. The conditioning mechanism of claim 1 wherein said mounting mechanism includes an adjustment apparatus operable to vary the minimum biasing force exerted on said upper roll by said torsion bar.

3. The conditioning mechanism of claim 2 wherein said mounting mechanism includes a hub assembly pivotally connected to said frame and journaled on a first pivot arm rotatably supporting the corresponding end of said upper roll for said movement relative to said lower roll, said one torsion bar end being mounted for movement with said hub assembly such that a movement of said first pivot arm effects a rotational movement of said hub assembly relative to said frame and a corresponding twisting of said one torsion bar end.

4. The conditioning mechanism of claim 3 wherein said adjustment apparatus includes a mounting collar fixed to said one torsion bar end and rotatably received within said hub assembly; a first adjustment member affixed to said mounting collar; a second adjustment member affixed to said hub assembly; and a draw bolt interconnecting said first and second adjustment members to selectively fix the rotative position of said mounting collar relative to said hub assembly, the rotative movement of said hub assembly being transferred to said one end of said torsion bar through said adjustment apparatus.

5. The conditioning mechanism of claim 4 wherein said hub assembly includes a first hub member rotatably supported from said first pivot arm and a second hub member rotatably supporting said mounting collar and being affixed to said second adjustment member, said first and second hub members being interconnected for simultaneous movement.

6. The conditioning mechanism of claim 4 wherein said hub assembly is pivotally connected to said frame by a connecting link, the movement of said hub assembly with said first pivot arm effecting a rotation of said hub assembly due to the pivotal connection thereof with the frame through said connecting link.

7. The conditioning mechanism of claim 6 wherein the other end of said torsion bar opposite to said one torsion bar end is pivotally connected to a second pivot arm rotatably supporting the corresponding end of said upper roll for said movement relative to said lower roll, the movement of said second pivot arm to move the corresponding said end of said upper roll away from the lower roll effecting a twisting of said torsion bar to increase the biasing force exerted on said upper roll.

8. The conditioning mechanism of claim 7 wherein said connecting link pivotally moves as the second pivot arm moves with said upper roll such that a moment arm, through which the biasing force exerted by said torsion bar is applied to said second pivot arm, shortens as the corresponding end of the upper roll raises relative to the lower roll to effect a reduction of the pressure exerted on the crop material by the upper roll.

9. The conditioning mechanism of claim 6 wherein said hub assembly has an anchoring arm extending outwardly therefrom for pivotal connection to said connecting link, said first pivot arm having a support member extending upwardly therefrom to rotatably support said hub assembly, the moment arm for the biasing force exerted by said torsion bar to rotate said first pivot arm to carry the corresponding end of the upper roll toward engagement with the lower roll being shortened as the first pivot arm raises to effect a reduction of the pressure exerted on the crop material by the upper roll.

10. The conditioning mechanism of claim 9 wherein said connecting link pivotally interconnects said anchoring arm and a subframe in which said upper and lower rolls are mounted.

11. A conditioning mechanism for use in a crop harvesting machine operable to gather crop material from a field and convey said crop material to the condiitioning mechanism for conditioning thereof comprising:
  a frame;
  a lower roll rotatably mounted in a fixed orientation relative to said frame;
  an upper roll rotatably mounted between first and second pivot arms pivotally supported from said frame to permit movement of said upper roll toward and away from said lower, said upper roll having first and second laterally spaced ends adjacent corresponding said pivot arms;
  a torsion bar having first and second transversely spaced ends corresponding to and connected with said first and second pivot arms to effect a biasing of said upper roll toward response to a movement of said pivot arms to move said upper roll aways from said lower roll, said torsion bar urging a movement of one upper roll end in an opposing direction toward said lower roll when the other upper roll end is moved away from said lower roll;
  a mounting mechanism connected to one of said torsion bar ends to control the twisting thereof when the corresponding said pivot arm moves, said mounting mechanism being movable with said corresponding pivot arm and being pivotally connected to said frame to effect a twisting of said one torsion bar end when moved with said corresponding pivot arm; and
  drive means operably connected to said upper and lower rolls to power the rotation thereof to condition crop material passing therebetween.

12. The conditioning mechanism of claim 11 wherein said mounting mechanism includes an adjustment apparatus operable to vary the minimum biasing force exerted on said upper roll by said torsion bar.

13. The conditioning mechanism of claim 12 wherein said mounting mechanism includes a hub assembly pivotally connected to said frame and journaled on said first pivot arm rotatably supporting the corresponding end of said upper roll for said movement relative to said lower roll, said one torsion bar end being mounted for movement with said hub assembly such that a movement of said first pivot arm effects a rotational movement of said hub assembly relative to said frame and a corresponding twisting of said one torsion bar end.

14. The conditioning mechanism of claim 13 wherein said adjustment apparatus comprises:
  a mounting collar fixed to said one torsion bar end rotatably received within said hub assembly;
  a first adjustment member affixed to said mounting collar;
  a second adjustment member affixed to said hub assembly; and
  a draw bolt interconnecting said first and second adjustment members to selectively establish the rotative position of said mounting collar relative to said hub assembly, thereby selectively determining the minimum biasing force exerted on the upper roll by said torsioning bar which is twisted simultaneously with the rotation of said mounting collar.

15. The conditioning mechanism of claim 14 wherein said hub assembly is pivotally connected to said frame by a connecting link to effect a rotational movement of said hub assembly when said hub assembly is moved with the corresponding pivot arm, the rotational movement of said hub assembly causing a twisting of said torsion bar due to a transfer of said rotational movement to said mounting collar through said adjustment apparatus.

16. The conditioning mechanism of claim 15 wherein the geometry of the mounting of the torsion bar and the connection thereof to the opposing first and second pivot arms provides a shortening of the moment arm for the exertion of the biasing force provided by said torsion bar oaan the respective pivot arms as the corresponding end of the upper roll raises relative to the lower roll, thereby effecting a reduction of the pressure exerted on the crop material passing between the upper and lower rolls.

17. A biasing mechanism operably connected to opposing ends of a movable member to urge said movable member toward a fixed member, comprising:
- a resilient means having first and second opposing ends corresponding to corresponding ends of said movable member to exert a biasing force on said movable member;
- first and second connecting linkages interconnecting, respectively, said first and second ends of said resilient means and the corresponding ends of said movable member so that a movement of either end of said movable member effects a deflection of the corresponding end of the resilient means and of the opposing end of the resilient means to increase the biasing force exerted by said resilient means on said movable member;
- a fixed anchor pivotally connected to one of said connecting linkages by an anchor member such that said resilient means has a base against which said resilient means can be deflected to create a minimum biasing force urging said movable member toward said fixed member;
- an adjustment apparatus associated with said one of said connecting linkages and said anchor member to permit a varying of the minimum biasing force; and
- a hub assembly rotatably supported relative to the corresponding end of said movable member, said anchor member being connected to said hub assembly to control the rotation thereof while moving with the corresponding end of said movable member to cause said deflection of the corresponding end of said resilient means, said adjustment apparatus interconnecting said hub assembly and said resilient means so that a rotation of said hub assembly is transferred to said resilient means to effect a deflection thereof.

18. The biasing mechanism of claim 17 wherein said resilient means is a torsion bar.

19. The biasing mechanism of claim 18 wherein the geometry of said first and second connecting linkages is such that a movement of either end of said movable member causes a reduction in a moment arm through which the biasing force exerted by said torsion bar is applied to the corresponding end of said movable member, such that the pressure is lessened as said movable member moves away from said fixed member.

* * * * *